(12) United States Patent
Sklaroff

(10) Patent No.: US 10,013,631 B2
(45) Date of Patent: Jul. 3, 2018

(54) COLLABORATION SYSTEM WITH RASTER-TO-VECTOR IMAGE CONVERSION

(71) Applicant: SMART Technologies ULC, Calgary (CA)

(72) Inventor: Jeff Sklaroff, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 64 days.

(21) Appl. No.: 15/249,064

(22) Filed: Aug. 26, 2016

(65) Prior Publication Data

US 2018/0060689 A1 Mar. 1, 2018

(51) Int. Cl.
*G06K 9/48* (2006.01)
*G06T 11/20* (2006.01)

(52) U.S. Cl.
CPC ............ *G06K 9/481* (2013.01); *G06T 11/203* (2013.01)

(58) Field of Classification Search
CPC . G06K 15/1836; G06K 15/1865; G06K 9/481
See application file for complete search history.

(56) References Cited

U.S. PATENT DOCUMENTS

| | | | |
|---|---|---|---|
| 5,448,263 A | 9/1995 | Martin | |
| 5,694,535 A * | 12/1997 | Broekhuijsen | G06T 11/203 345/442 |
| 5,781,668 A * | 7/1998 | Starkweather | H04N 1/4072 382/270 |
| 6,141,000 A | 10/2000 | Martin | |
| 6,337,681 B1 | 1/2002 | Martin | |
| 6,747,636 B2 | 6/2004 | Martin | |
| 6,803,906 B1 | 10/2004 | Morrison | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 8,456,451 B2 | 6/2013 | Morrison et al. | |
| 8,619,027 B2 | 12/2013 | Hill et al. | |
| 9,288,440 B2 | 3/2016 | Xin et al. | |
| 2005/0271296 A1* | 12/2005 | Tsuji | G06K 9/3283 382/275 |
| 2008/0282203 A1* | 11/2008 | Davis | G06Q 10/06 715/863 |
| 2012/0249422 A1 | 10/2012 | Tse et al. | |
| 2015/0029165 A1 | 1/2015 | Thompson et al. | |
| 2015/0277586 A1 | 10/2015 | Trenholm-Boyle et al. | |
| 2016/0054972 A1* | 2/2016 | Igawa | G06F 3/1431 345/2.2 |

* cited by examiner

*Primary Examiner* — Eueng-Nan Yeh
(74) *Attorney, Agent, or Firm* — King & Schickli, PLLC

(57) ABSTRACT

A method for producing digital ink in a collaboration session between a first computing device and a second computing device that presents a digital canvas. In some embodiments, the method includes capturing a raster image of content using a camera operably coupled to the first computing device, deriving first image vectors and second image vectors based on first and second portions, respectively, of the raster image, sending the first image vectors to the second computing device for displaying a first digital ink object based on the first image vectors, and sending the second image vectors to the second computing device for displaying a second digital ink object based on the second image vectors after the displaying of the second digital ink object.

19 Claims, 13 Drawing Sheets

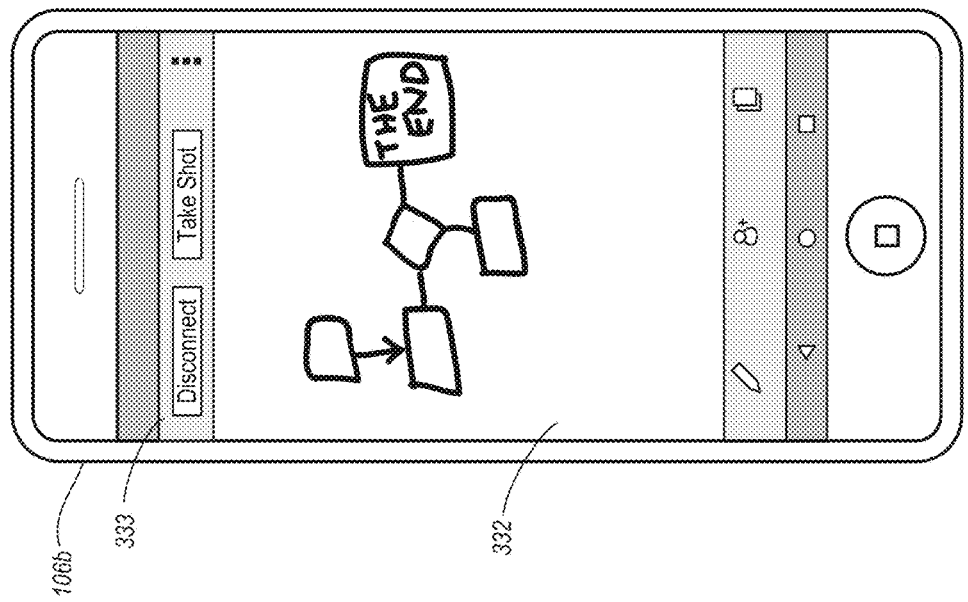
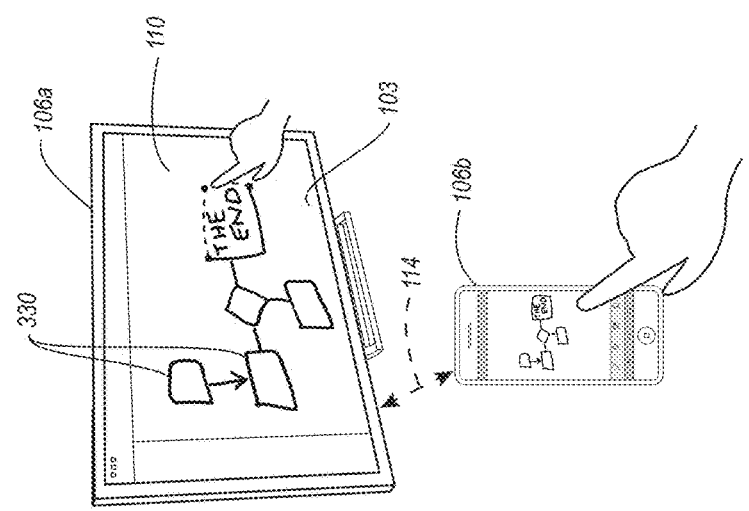
Fig. 3B
Fig. 3A

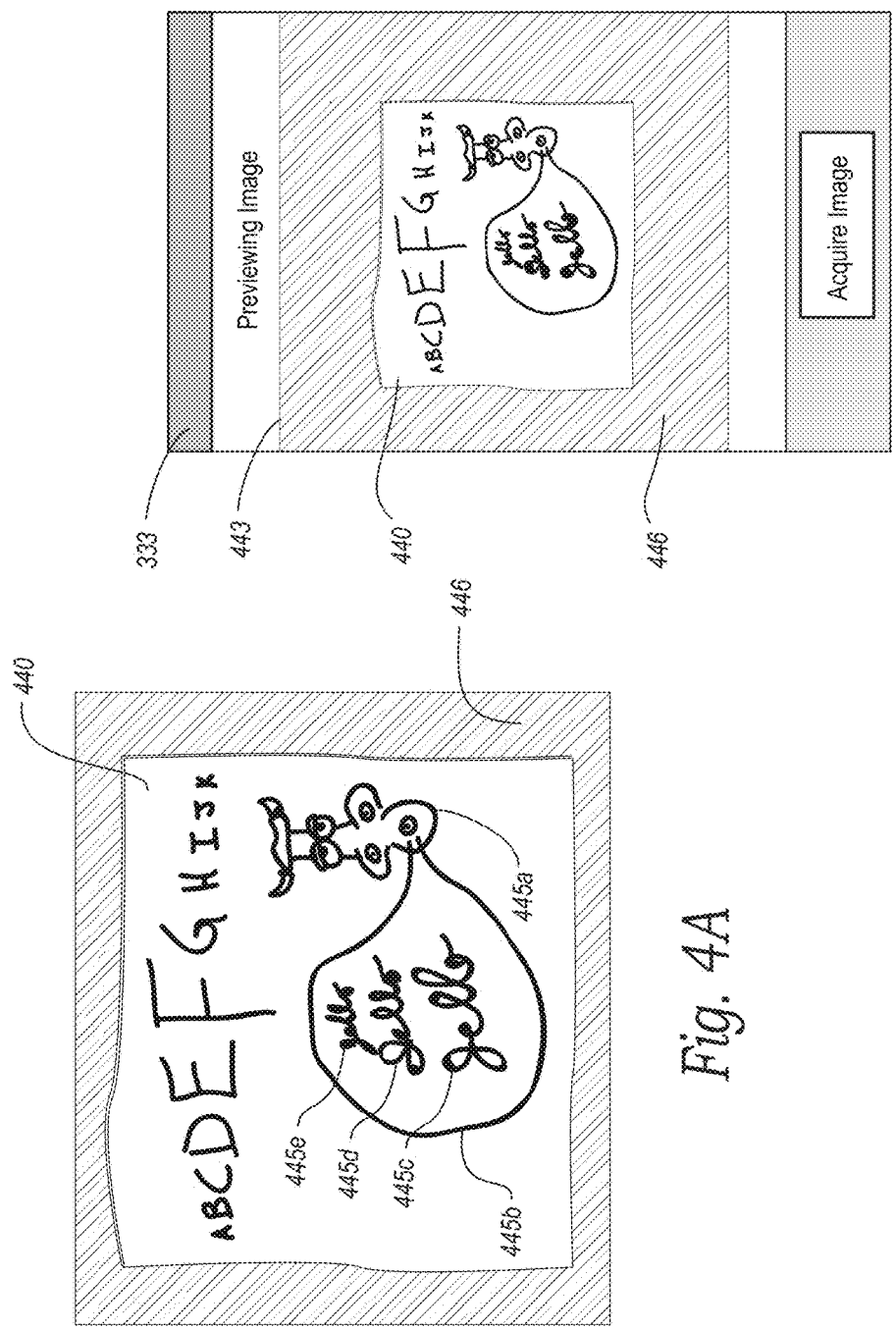

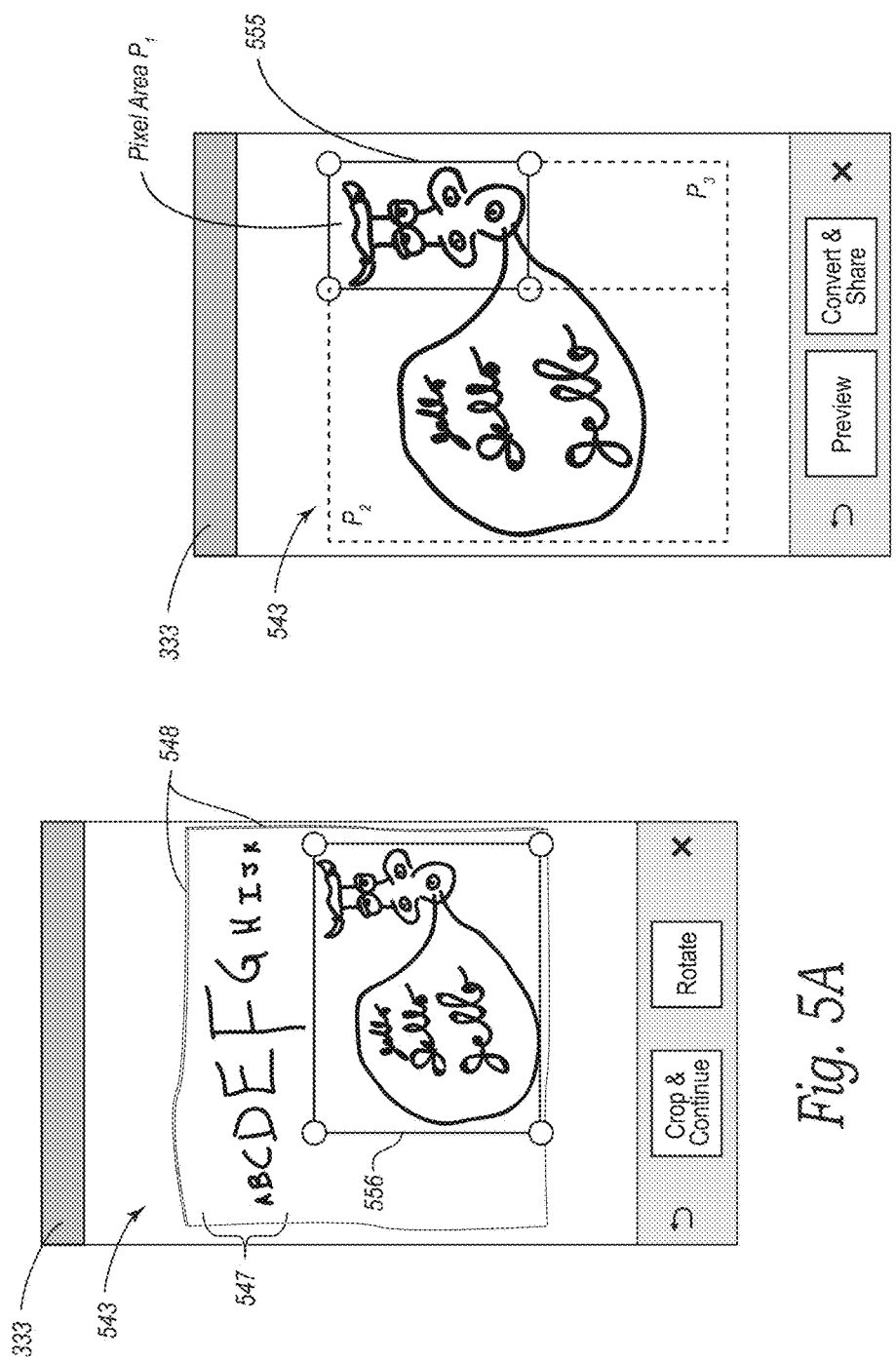

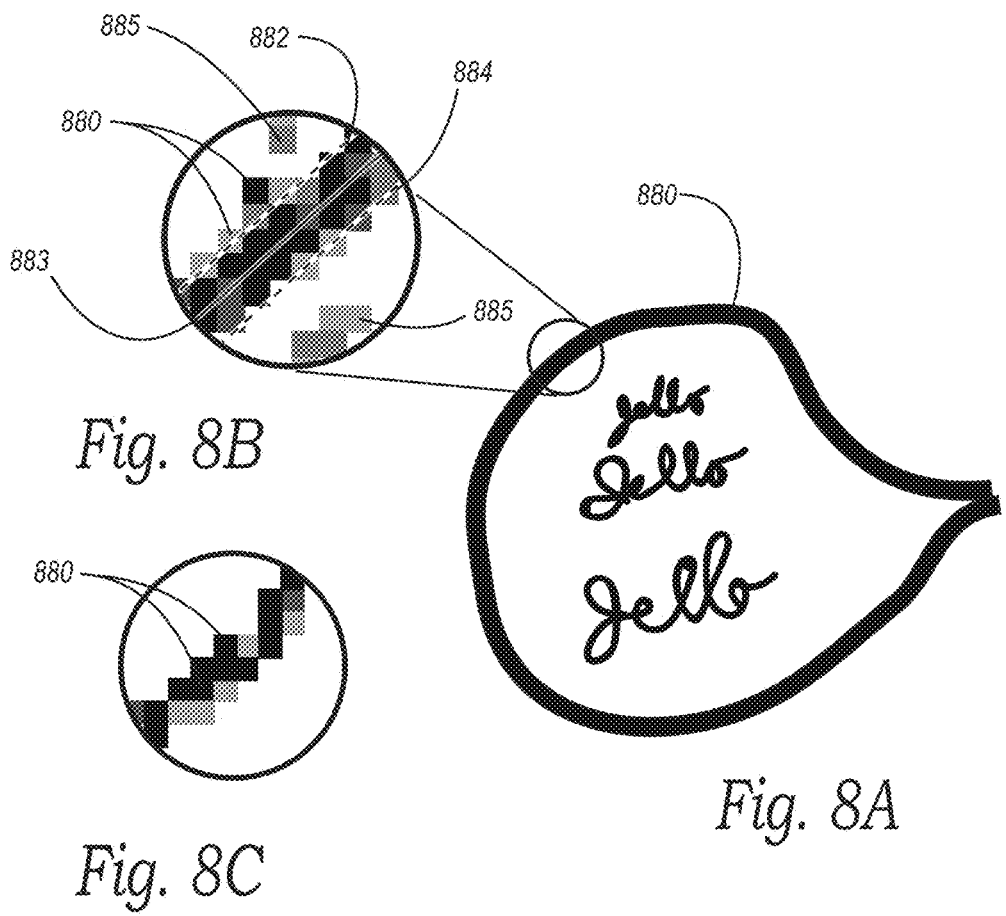
Fig. 8B
Fig. 8C
Fig. 8A
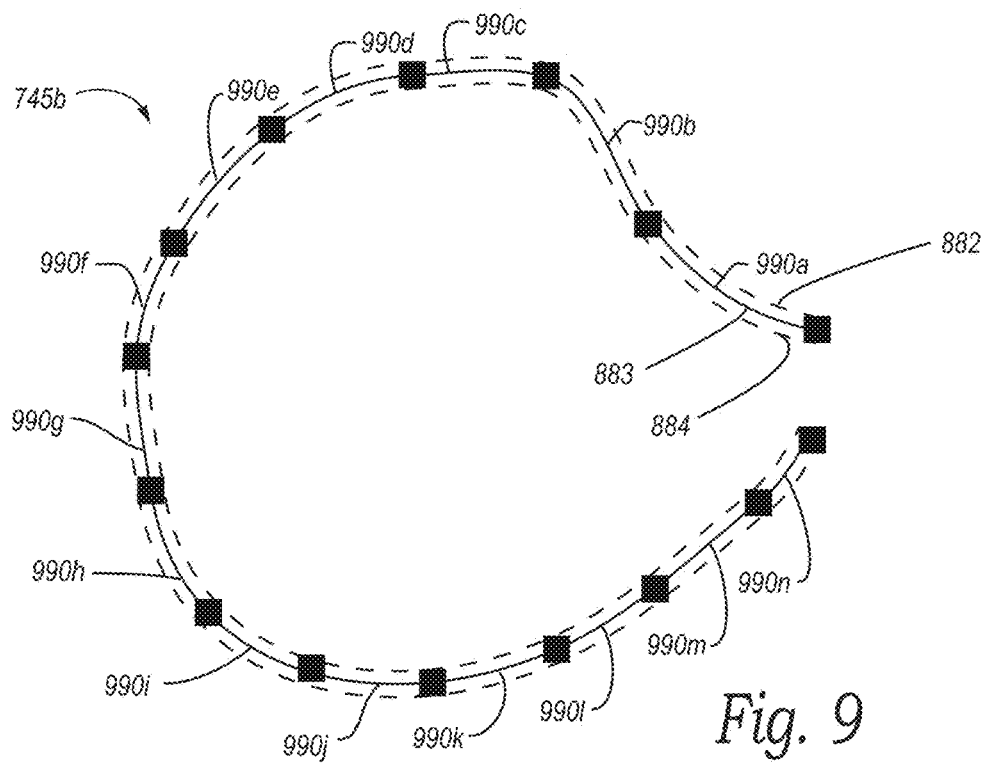
Fig. 9

COLLABORATION SYSTEM WITH RASTER-TO-VECTOR IMAGE CONVERSION

TECHNICAL FIELD

The disclosed embodiments relate generally to computing devices and systems for providing collaboration sessions, and, in particular, to collaboration systems with raster-to-vector image conversion for producing digital ink.

BACKGROUND

Display systems typically include a display and optionally input devices. An interactive display system ("interactive system") can include an interactive canvas onto which digital content is presented. The interactive system can also include a touchscreen as an input device configured to display the interactive canvas. Users can interact with the system using the touchscreen, e.g., to provide input. The interactive system can detect pointer interactions between the canvas and a pointing device, such as a pen tool, or a user's finger or hand. Content can be added, modified, or erased based on the pointer interactions.

In some display systems, multiple users can view and/or add digital content to an interactive canvas. In such systems, a plurality of computing devices can connect to a common host server. The host server executes a collaboration application that presents the canvas of a host computing device to each of the other users via their corresponding computing devices. The collaboration application allows the users to work together in a collaboration session. Users can make handwritten annotation with a pen tool or their hand in the form of digital ink. Digital ink is often stored on the canvas in vector form which provides scalability and allows the ink to be easily manipulated and modified (e.g., erased).

Users can sometimes share content, such as images, on the canvas. One challenge with conventional techniques for sharing images is that they are typically stored on the canvas in their native format such as a bitmap or in another non-vector format. Such formats do not enable the user to interact with the image in the same manner as digital ink. For example, bitmaps are not infinitely scalable nor they can be readily modified through erasure or other vector-based graphical operations.

BRIEF DESCRIPTION OF THE DRAWINGS

FIGS. 3A-6B are a series of diagrams showing raster-to-vector image conversion by a participant device of the interactive display system.

FIGS. 8A-9 are a series of diagrams illustrating the derivation of image vectors from pixel data.

DETAILED DESCRIPTION

Embodiments of collaboration systems with raster-to-vector image conversion for producing digital ink are described herein. In various embodiments, the collaboration system facilitates a collaboration session between a participant device (e.g., a mobile device) and an interactive display device that presents a digital canvas for displaying digital ink objects (e.g., handwritten annotations). A user of the participant device can use the device's camera to acquire a raster image of content, such as content drawn by the user on a paper napkin. The participant device converts the raster image into digital vectors that are sent to the interactive display device over a series of messages (e.g., packets). The interactive display produces digital ink objects that are presented at the display as a digital ink object in the same format used for hand-drawn and other digital ink objects.

In some embodiments, the collaboration system enables the content of the raster image to be converted to digital ink that can be modified on the canvas in a dynamic manner. For example, users sharing the canvas can scale, modify, erase, or otherwise interact with digital ink objects converted from raster images (e.g., bitmaps) in a manner that is typically not possible with traditional raster images, which typically require additional application software for modification. In some embodiments, the raster-to-vector conversion process can be controlled by the user of the participant device to achieve a desired fidelity of the digital ink object(s) and/or to control the number of digital ink objects generated during the conversion. Reducing the number of digital ink objects, for example, can reduce the number of messages required to communicate the digital objects to the interactive display, which can conserve bandwidth. In some embodiments, the messages are sent in real-time or near real-time as the raster content is converted. In various embodiments, users can begin interacting with the associated digital objects as soon as they are received and presented on the canvas, rather than having to wait for all of the raster content to be converted before the digital objects can be presented.

Various details are set forth in the following description and FIG. 1-12 to provide a thorough understanding of various embodiments of the disclosed technology. Other details describing well-known structures, systems, and methods, however, are not set forth below to avoid unnecessarily obscuring the description of the various embodiments of the technology. In the Figures, identical reference numbers identify at least generally similar elements.

Figure 1:
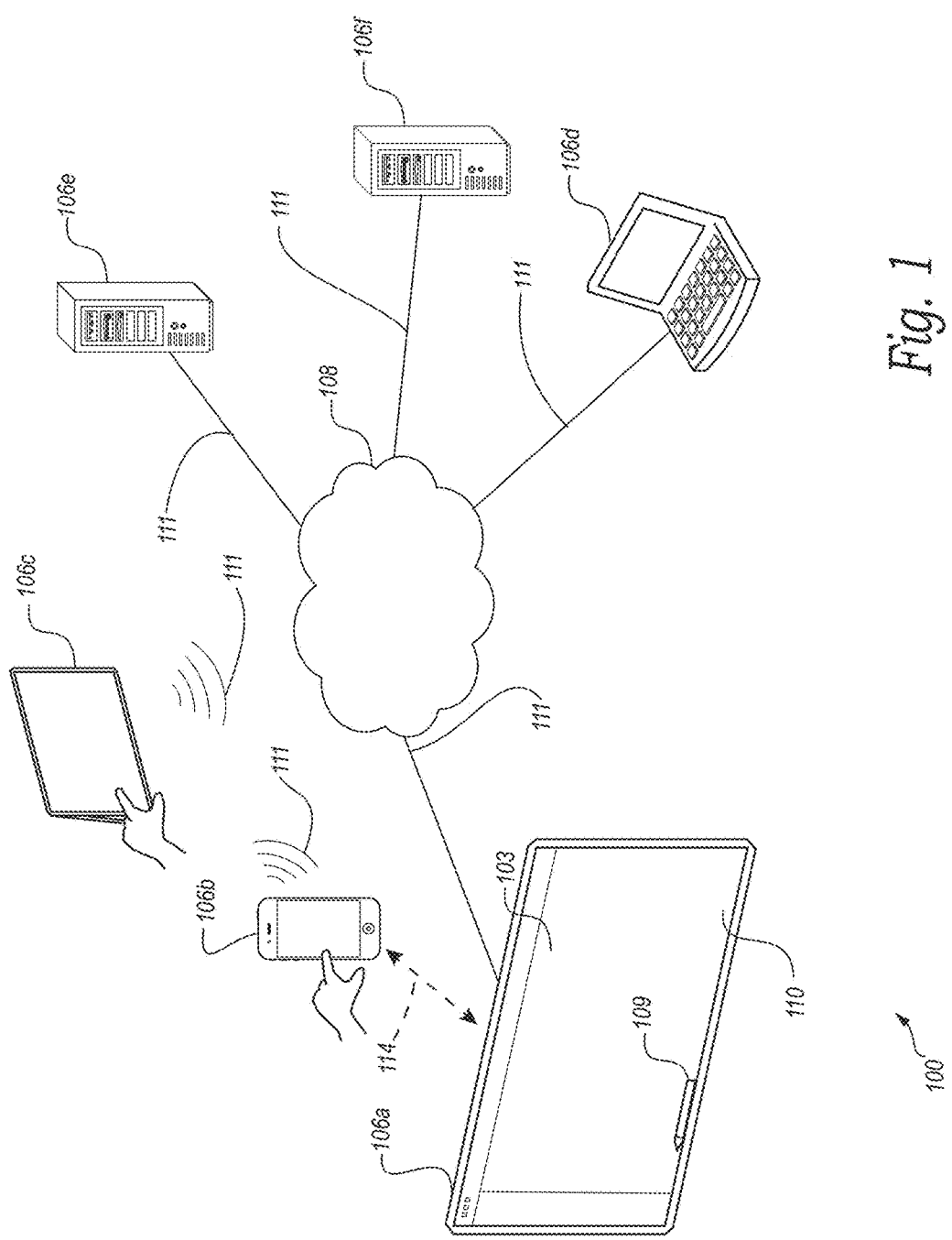
FIG. 1 is a block diagram illustrating an overview of an environment in which an interactive display system can be implemented.

FIG. 1 is a block diagram illustrating an overview of an environment in which an interactive display system 100 can be implemented. The system 100 includes a plurality of computing devices 106 connected to one another through a network 108. The computing devices can include for, example, an interactive display device 106*a* ("interactive display 106*a*"), one or more participant devices 106*b*-106*d*, and one or more server devices 106*e* and 106*f*. The network 108 may be wired, wireless, or a combination thereof in which the computing devices 106 are connected directly or indirectly to the network 108 over corresponding wired and/or wireless network connections 111. At least some of the computing devices 106 include a display, such as a touchscreen, a video projector, an LCD or LED display, or the like, having a corresponding display area. For example, in the illustrated embodiment, the interactive display 106a has a display area 110 (e.g., an interactive presentation screen) through which a presenter or other user can interact with the interactive display 106a using a pointer (e.g., an active or passive pointer), such as a pen tool 109, a user's finger(s), a mouse, etc. In some embodiments, the display device 106 can include, for example, Smart kapp IQ™, Smart kapp IQ Pro™ Smart Board 4000 series, or a Smart Board 6000 series display available from assignee SMART Technologies, ULC of Calgary, Alberta, Canada. In various embodiments, the interactive displays can include an interactive display or system described in U.S. Pat. Nos. 5,448,263; 6,141,000; 6,337,681; 6,747,636; 6,803,906; 7,236,162; 7,232,986; 7,274,356; 8,456,45; 8,619,027; and 9,288,440.

The computing devices 106 can enable participants of the system 100 to receive, view, store, and/or otherwise interact with graphical content. In various embodiments, graphical content may be viewed, added, modified, or erased via a corresponding display area of the device. For example, in some embodiments, participants can interact with the graphical content in a manner described in U.S. patent application Ser. No. 15/147,225, assigned to SMART Technologies ULC, and which is incorporated by reference herein in its entirety. One or more server devices 106e and 106f can verify, create, host, and/or perform other functions to facilitate a collaboration session between the various computing devices 106, such as by exchanging and processing communications over the network 108, storing a central copy of a digital canvas, globally updating graphical content, etc. In addition or alternatively, one or more of the computing devices 106, such as the interactive display 106a and/or another one of the computing devices 106, can individually or collectively perform one or more of these functions. Examples of well-known computing devices, systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, databases, distributed computing environments that include any of the above systems or devices, or the like.

In various embodiments, the interactive display 106a is designated as a host device and hosts the collaboration session. A host device can retain primary control of a digital canvas 103 presented at the display area 110, such as during a live presentation by a presenter (e.g., a teacher, a lecturer, a meeting facilitator, etc.). In various embodiments, the canvas 103 can be a two-dimensional workspace onto which input in the form of digital ink, graphical objects, or other digital objects may be made by participants of a collaboration session. In other embodiments, one of the other computing devices 106 can be designated as a host device, and the interactive display 106a can be designated as a participant device.

In some embodiments, the host device (e.g., the interactive display 106a in the illustrated embodiment) can join one or more participant devices (e.g., the participant device 106b, such as a mobile device) to the collaboration session over a wireless connection 114 (e.g., a Bluetooth connection) or other wireless and/or wired connection(s). The wireless connection 114 can be a connection that is separate, or at least initially separate, from the participant devices' network connection 111 to the network 108. In use, the wireless connection 114 allows the participant device 106b to join up with the collaboration session when the device 106b is within the vicinity of the interactive display 106a.

Figure 2:
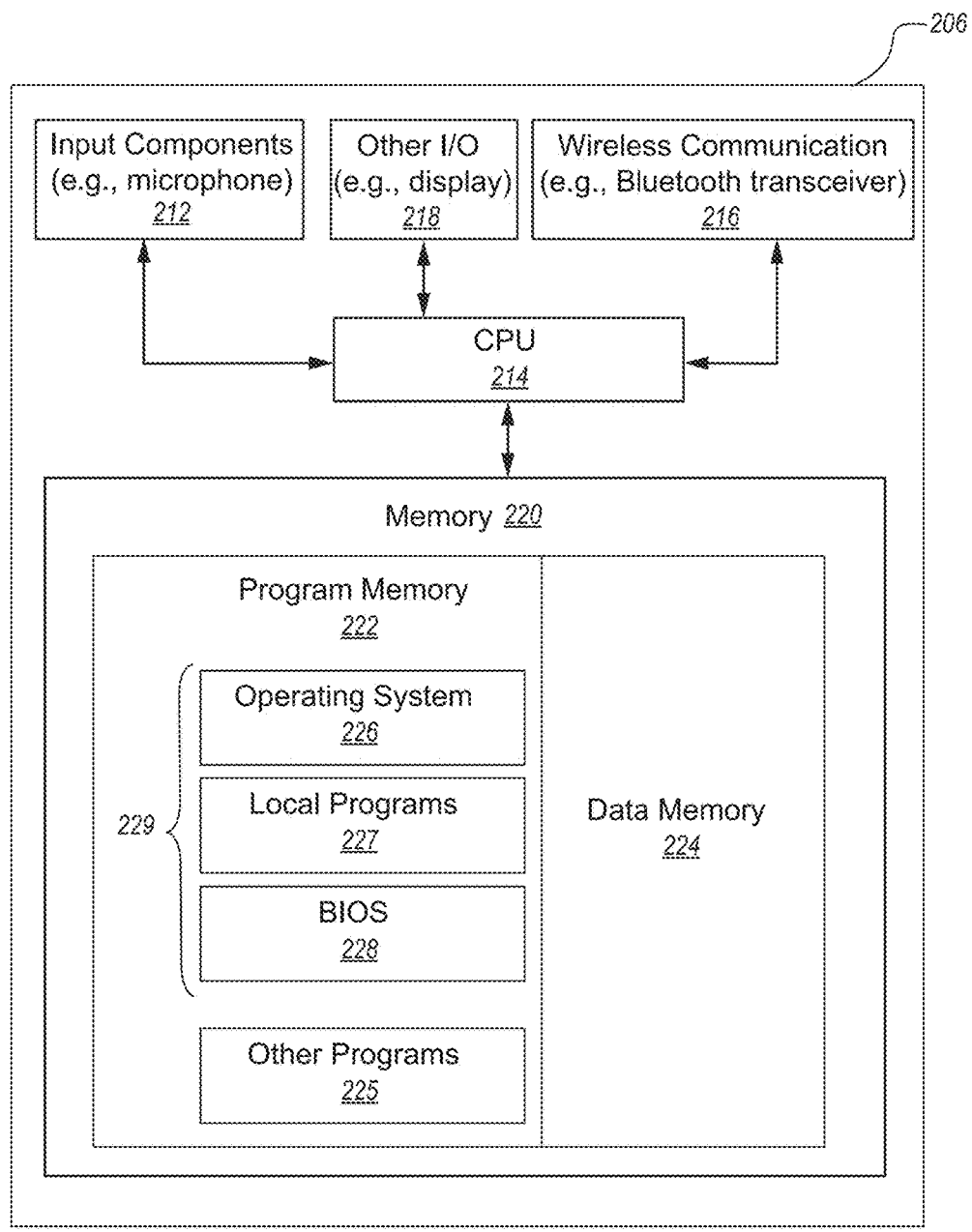
FIG. 2 is a block diagram illustrating components of a computing device in which aspects of the interactive display system can be implemented.

FIG. 2 is block diagram illustrating components of a computing device 206, such as the interactive display device 106a (FIG. 1). The computing device 206 includes input components 212 configured to provide input to a processor such as CPU 214, notifying it of actions. The actions are typically mediated by a hardware controller that communicates according to one or more communication protocols. The input components 212 can include, for example, a mouse, a keyboard, a touchscreen, an infrared sensor, a touchpad, a wearable input device, a pointer device, a camera- or image-based input device, a pointer, and/or one or more microphones. The microphone(s) can include, for example, built-in microphones, directional microphones, and/or other transducer devices or the like for detecting acoustic signals in the detection region 130.

The CPU 214 can be a single processing unit or multiple processing units in a device or distributed across multiple devices. The CPU 214 can be coupled to other hardware components via, e.g., a bus, such as a PCI bus or SCSI bus. Other hardware components can include communication components 216, such as a wireless transceiver (e.g., a WiFi or Bluetooth transceiver) and/or a network card. Such communication components 216 can enable communication over wired or wireless (e.g., point-to point) connections with other devices. A network card can enable the computing device 206 to communicate over the network 108 (FIG. 1) using, e.g., TCP/IP protocols. Additional hardware components may include other input/output components 218, including a display, a video card, audio card, USB, firewire, or other external components or devices, such as a camera, printer, CD-ROM drive, DVD drive, disk drive, Blu-Ray device, and/or speakers.

The CPU 214 can have access to a memory 220. The memory 220 includes volatile and non-volatile components which may be writable or read-only. For example, the memory can comprise CPU registers, random access memory (RAM), read-only memory (ROM), and writable non-volatile memory, such as flash memory, hard drives, floppy disks, CDs, DVDs, magnetic storage devices, tape drives, device buffers, and so forth. The memory 220 stores programs and software in programming memory 222 and associated data (e.g., configuration data, settings, user options or preferences, etc.) in data memory 224. The programming memory 222 contains an operating system 226, local programs 227, and a basic input output system (BIOS) 228, all of which can be referred to collectively as general software 229. The operating system can include, for example, Microsoft Windows™, Apple iOS, Apple OS X, Linux, Android, and the like. The programming memory 222 also contains other programs and software 225 configured to perform various operations.

The various programs and software can be configured to detect interactions with pointers (e.g., the pen tool 109; FIG. 1) and host or participate in a collaboration session via the network connection 111 (FIG. 1). The collaboration application enables multiple computing devices to join the collaboration session using, e.g., a web browser and/or a stand-alone application (e.g., an App) running on the individual computing devices. Each collaboration session can have a unique identifier (e.g., a unique URL address) associated with it, allowing the computing devices to exchange packetized information (i.e., IP packets) during the collaboration session. The collaboration application can store graphical content on the canvas 103 (FIG. 1). The participants of the session can manipulate the canvas 103 by e.g., adjusting the background color, zoom-level or zoom area, etc. according to their preferences. In some embodiments, the participants of the session may be made to follow the view of a participant who is in control of the control pen (e.g., in "a follow-me" mode as described in U.S. Pat. No. 9,288,440 assigned to the assignee of the subject application). The various programs and software can also be configured to produce digital ink objects based on image vectors corresponding to content of a raster image acquired by one or more of the participant devices 106 (FIG. 1), as described in further detail below with reference to FIGS. 3A-12.

Those skilled in the art will appreciate that the components illustrated in FIGS. 1 and 2 described above, and in each of the diagrams discussed below, may be altered in a variety of ways. For example, the order of the logic may be rearranged, substeps may be performed in parallel, illustrated logic may be omitted, other logic may be included, etc. For example, blocks and/or arrows shown in dashed lines may be excluded from some implementations. However, applicants do not intend to say that only blocks and/or only arrows shown in dashed lines may be excluded from some implementations.

FIGS. 3A-6B are a series of diagrams showing the participant device 106b and a user interface 333 presented by the participant device 106b during various stages of raster-to-vector image conversion. Referring to FIG. 3A, the participant device 106b communicates with the interactive display 106a over the wireless connection 114 by exchanging messages, such as Bluetooth packets, as described in further detail below with reference to FIGS. 7A-7F. The interactive display 106a presents the canvas 103 at the display area 110 and digital ink objects 330 on the canvas 103 in response to interactions made by users during a collaboration session. The digital ink objects 330 can include, for example, freeform or handwritten vector-based ink objects that can be input and manipulated via pointer interactions, as discussed above. In various embodiments, the digital ink objects 330 can be in the form of one or more ink strokes (e.g., straight and/or curved lines). In some embodiments, the digital ink objects 330 can include erase objects, fill objects bound by ink strokes, and/or other vector-based objects (e.g., circles, squares, or other shapes).

Referring to FIG. 3B, the participant device 106b includes a touchscreen display 332 ("touchscreen 332") configured to display the user interface 333 and to detect interactions made via the touchscreen 332. In the illustrated embodiment, the participant device 106b is operably coupled to an on-board camera (not shown), for example, at the opposite side of the touchscreen 332. In other embodiments, the camera can be a stand-alone camera.

The user interface 333 is configured to present at least a portion of the canvas 103 at the participant device 106b, and to display digital ink objects on the canvas 103. The user interface 333 also presents various menus, text, soft buttons, etc. adjacent the portion of the canvas 103 at the touchscreen 332. In the illustrated example, the soft-button labeled "Take Shot" enables a user to access and control the camera of the device 106b.

FIGS. 4A and 4B show the user interface 333 presenting a preview image 443 of a paper drawing 440 (e.g., a napkin drawing). Referring to FIG. 4A, the drawing 440 includes handwritten content 445 in the form of a cartoon sketch 445a, a text bubble 445b adjacent the cartoon sketch 445a, and cursive lettering 445c-e within the text bubble 445b. In other embodiments, the content of an image can include virtually any content that can be captured in an image, such as a picture of a person, an object, artwork, a photograph, etc. In various embodiments, the technology can be implemented by users who do not have access to an expensive document scanner, but would like to continue a discussion previously visualized on an analog whiteboard (or blackboard), a piece of paper (e.g. a flip chart), a back of a napkin, etc. As described below, such users can use the technology to reconstitute the content in a collaboration session, where it can be manipulated, saved, and shared with remote participants. In additional or alternate embodiments, an image may be acquired through download or other means rather than by the device camera.

Referring to FIG. 4B, the preview image 443 can be a live image (e.g., a live video) presented through a real-time feed by the device camera. The preview image 443 displays the drawing 440, its content 445, and a background area 446 (e.g., a tabletop surface) surrounding the drawing 440. The preview image 443 can enable a user to preview the image that will ultimately be captured and stored on the participant device 106b. A user can preview the image 443 to center the drawing 440 within a field of view and/or adjust certain imaging parameters, such as contrast level, exposure, file size, etc. In some embodiments, the user interface 333 can automatically set the exposure level to slightly overexposed to enhance image contrast. In the illustrated example, a user can capture a raster image corresponding to the preview image 443 by selecting the soft-button labeled "Acquire image."

FIG. 5A shows the user interface 333 presenting a raster image 543 corresponding to the preview image 443 of FIG. 4B. The raster image 543 can include pixel data stored in the form of, e.g., a bit map, a Tiff file, etc. A user can rotate the image 543 and/or crop the raster image 543 using a rectangle 556 or other similar selection feature (e.g., a lasso or polygon) by selecting the soft buttons labeled "Crop & Continue" and "Rotate," respectively. The cropped portion(s) of the raster image 543 will be converted into digital ink, while the uncropped portion(s), such as uncropped text 547, will not be converted. In some embodiments, image processing can be carried out on the raster image 543 to suggest to the user an area of the image to be cropped. For example, object recognition can be used to identify edges 548 of the drawing 440 (FIG. 4B) for automatically cropping the background area 446 (FIG. 4B) from the raster image 543.

FIG. 5B shows the user interface 333 presenting the raster image 543 after it has been cropped, and a preview window 555 (e.g., a rectangle, lasso, etc.) surrounding a first pixel area $P_1$ of the image 543. The first pixel area $P_1$ corresponds to the cartoon sketch 445a (FIG. 4A) of the drawing 440 (FIG. 4A). The preview window 555 enables a user to preview image raster-to-vector conversion of the first pixel area $P_1$ before the remainder of the raster image is converted. In the illustrated embodiment, the user can preview conversion of the selected pixel area $P_1$ by selecting the soft button labeled "Preview." Alternately, the user can proceed to convert the entire raster image without previewing it by selecting the soft button labeled "Convert & Share."

In some embodiments, a user may preview conversion of the entire raster image. In such embodiments, the user can preview the entire conversion to observe what the final result will look like on the canvas 103 and give the user an opportunity to revisit conversion of other pixel areas, such as pixel areas $P_2$ and $P_3$. The user can also position the previewed image on the canvas 103 displayed at the touchscreen 332 to indicate where it should be placed on the canvas 103 as presented at the interactive display 106a.

Figure 6B:
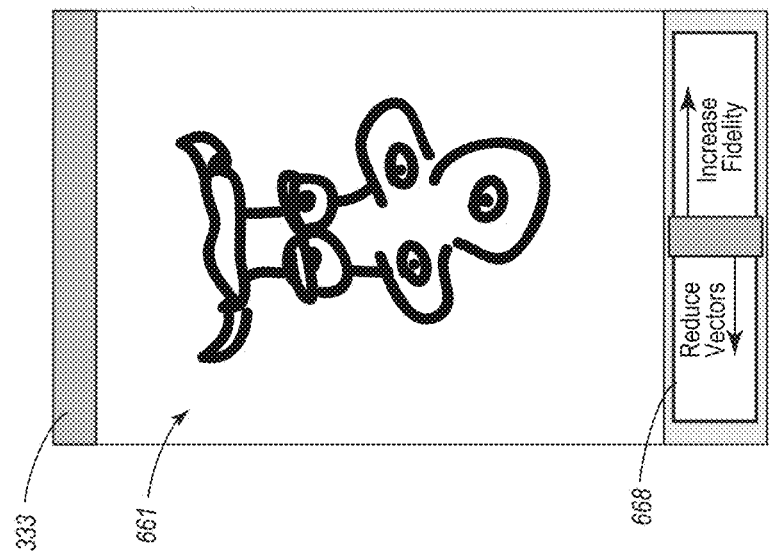
Figure 6A:
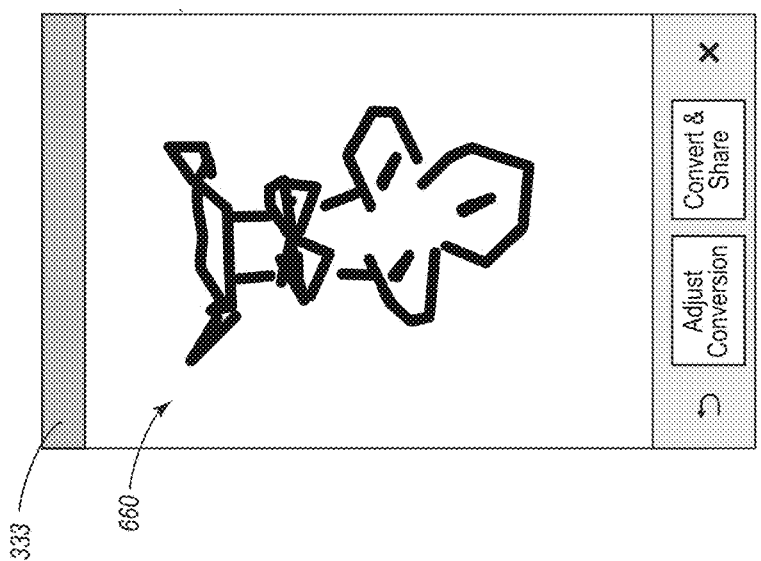

FIG. 6A shows the user interface 333 presenting initial image vectors 660 corresponding to the first pixel area P₁ (FIG. 5B). The user can adjust image-to-vector conversion before it sends image vectors to the interactive display 106a (FIG. 3A). For example, FIG. 6B shows the user interface 333 presenting first image vectors 661 that have been derived by adjusting the algorithm and/or parameters used to produce the initial imaging vectors 660. In the illustrated example, the user can operate a slide tool 668 to adjust the raster-to-vector conversion after selecting the soft button labeled "Adjust Conversion" in FIG. 6A. As the slide tool 668 is moved to the right or left, the participant device 106b re-derives the first imaging vectors 661 by updating one or more conversion algorithms and/or parameters based on the user's feedback. In the illustrated embodiment, for example, a user has increased the fidelity of the conversion by sliding the slide tool 668 to the right. In general, increasing fidelity increases the number image vectors used to convert content from a raster image, which can increase computational time. Decreasing the number of vectors (e.g., by sliding the slide tool 663 to the left), on the other hand, may reduce computational time, but with a trade-off of reduced fidelity.

Once the user has selected the desired conversion, the user can proceed to transfer image vectors to the interactive display 106a (FIG. 3A) for display as digital ink objects by selecting the soft button labeled "Convert & Share" in FIG. 6A. Upon doing so, the participant device 106b will create and send a message or a series of messages to the interactive display 106a containing the first image vectors 661 corresponding to the first pixel area P₁ (FIG. 5B). The participant device 106b will also proceed to convert and send image vectors corresponding to the remaining pixel areas P₂ and P₃ (FIG. 5B) of the raster image 543, as described below.

Figure 7A:
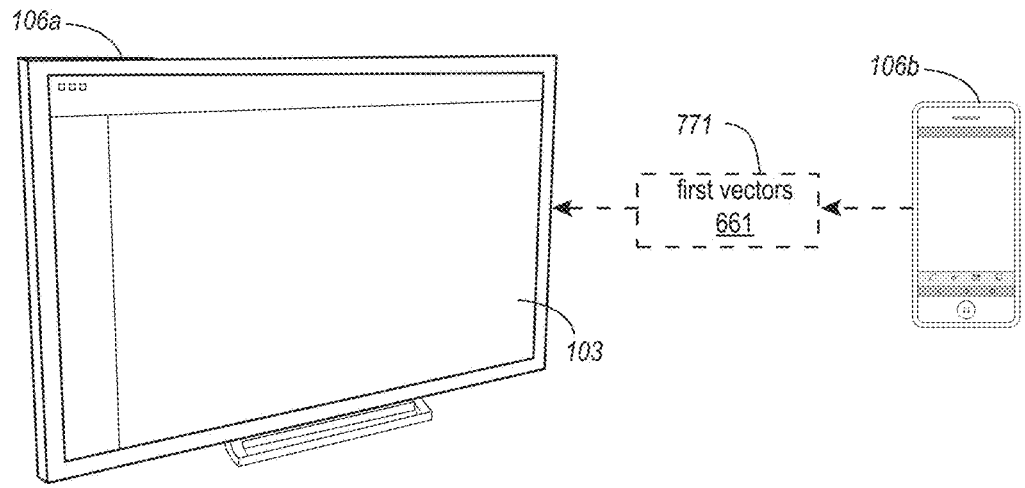
FIGS. 7A-7F are a series of diagrams showing the participant device sending messages containing image vectors to an interactive display device, and the interactive display presenting corresponding digital ink objects on a digital canvas.
Figure 7B:
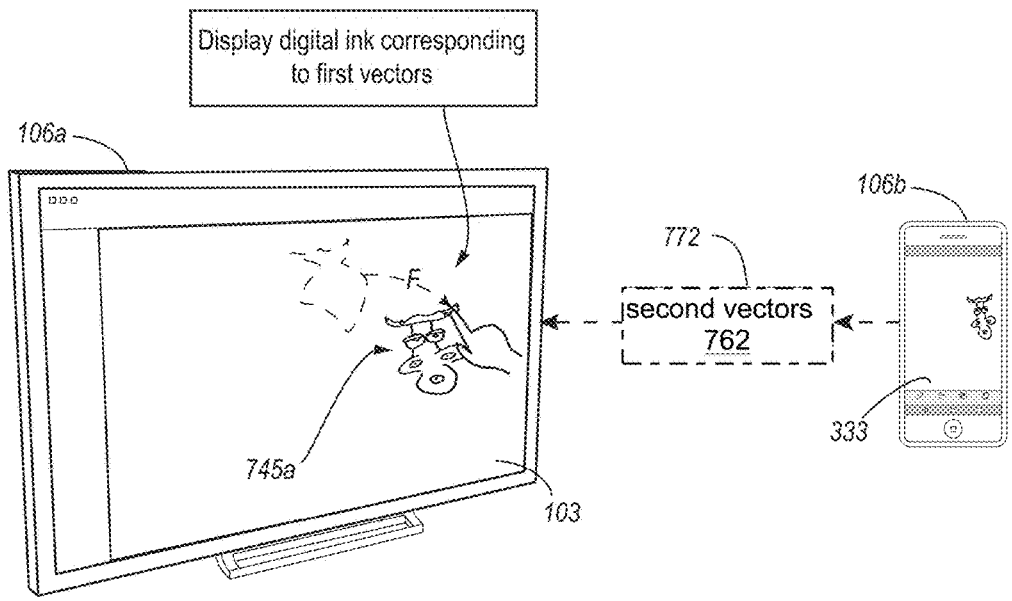

FIGS. 7A-7F are a series of diagrams showing messages containing image vectors sent from the participant device 106b to the interactive display 106a for displaying digital objects. FIG. 7A shows the participant device 106a sending a first message 771 containing the first image vectors 661 if FIG. 6B. As shown in FIG. 7B, the interactive display 106b uses the first image vectors 661 to produce a corresponding first digital object 745a on the canvas 103 corresponding to the cartoon sketch 445a of the drawing 440 (FIG. 4A). In some embodiments, the participant device 106b can display the first digital ink object 745a (i.e., rather than the raster image) on the touchscreen 333 while the device 106b is concurrently converting the raster image in the background. In various embodiments, a user at the interactive display 106 can reposition the digital ink object 745a on the display area 110, as shown by arrow F.

Figure 7C:
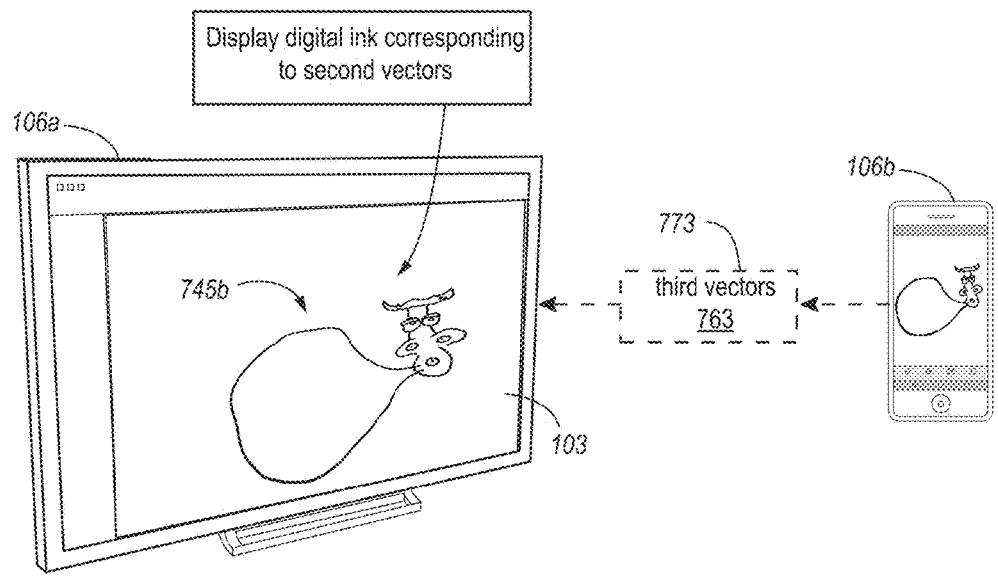
Figure 7D:
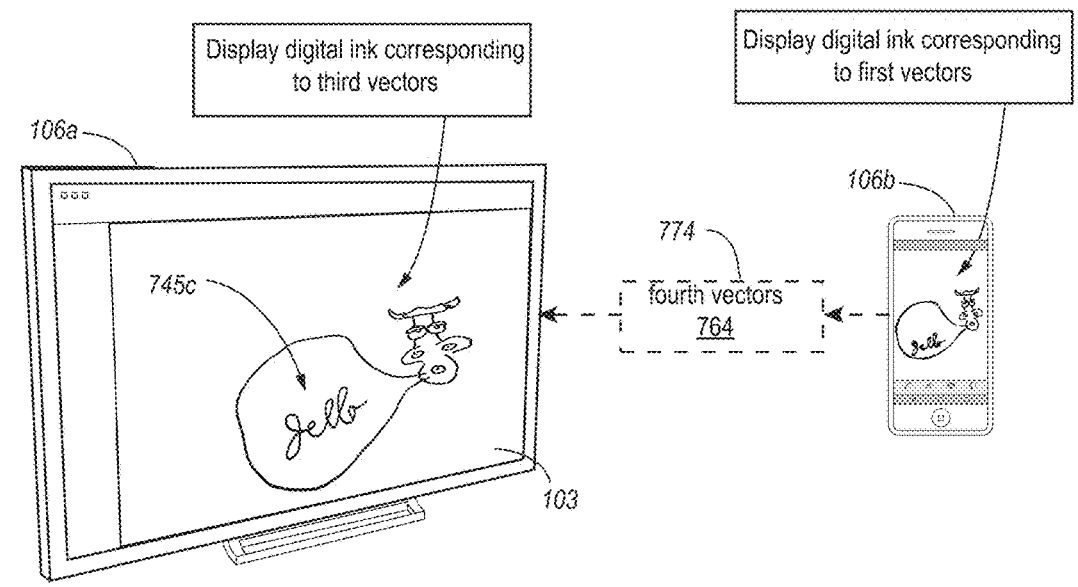

FIG. 7C shows the interactive display 106a presenting a second digital ink object 745b on the canvas 103 based on second vectors 762 (FIG. 7B) produced by the participant device 106a. The second vectors 762 are based on pixel data in the second pixel area P₂ (FIG. 5B) of the raster image, and correspond to the text bubble 452 of the drawing 440 (FIG. 4A). The participant device 106b sends the second vectors 762 in a second message 772 (FIG. 7B) after sending the first message 771 (FIG. 7A) and concurrent with the display of the first digital ink object 745a (FIG. 7A).

Figure 7E:
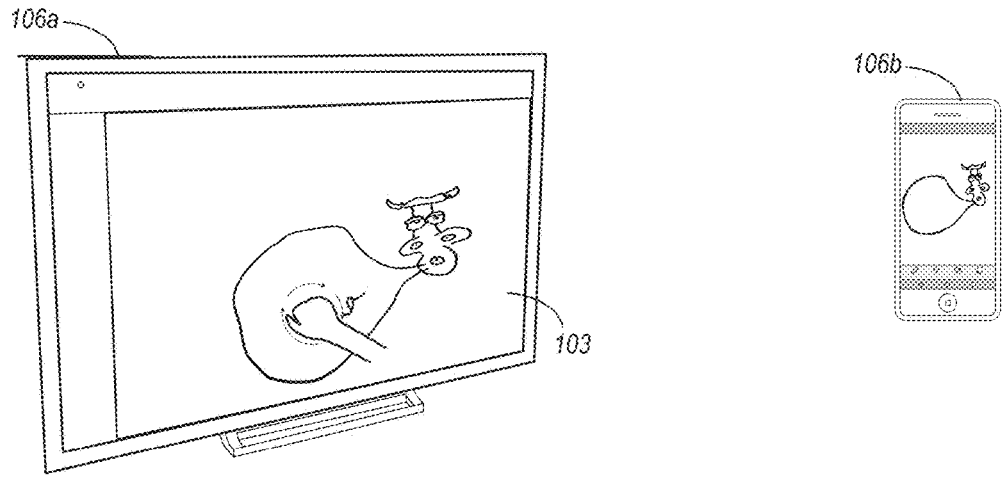
Figure 7F:
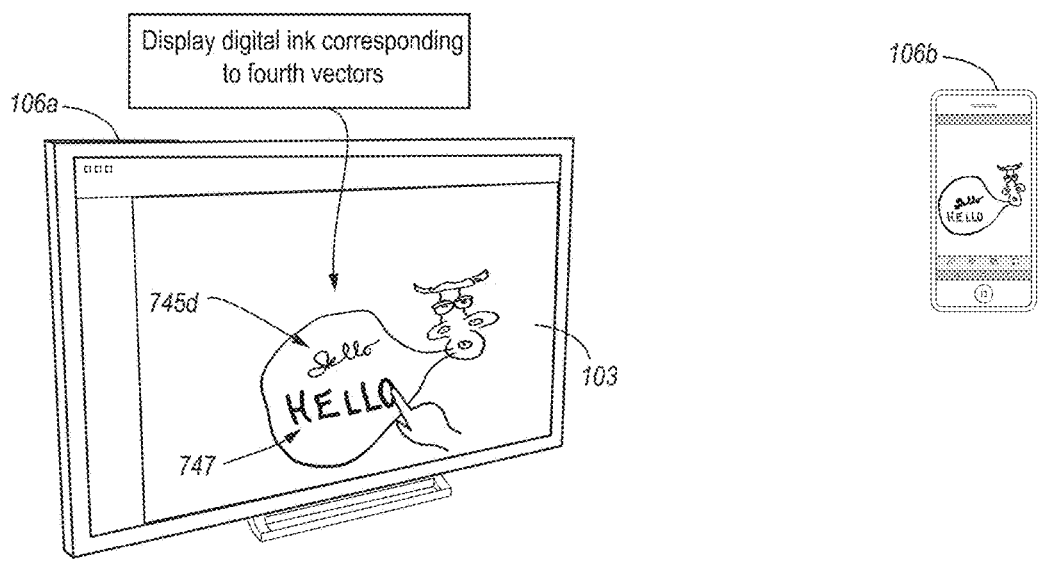

The participant device 106b can convert the remainder of the raster image 543 (FIG. 5B) by continuing to derive and send image vectors until the raster image is fully processed. For example, the participant device 106b can send a third message 773 (FIG. 7C) containing third vectors 763 corresponding to a cursive text object 745c (FIG. 7D), and a fourth message 774 (FIG. 7D) containing fourth image vectors 764 corresponding to a cursive text object 745d (FIG. 7F).

In some embodiments, users can interact with digital ink objects as soon as they are presented at the canvas 103. For example, in the embodiment shown in FIG. 7E, a user erases the initial cursive text object 745c before the next cursive text object 745d is presented at the interactive display 106a, as shown in FIG. 7E.

In some embodiments, users can interact with the digital ink objects at the canvas 103 while they are being converted and without interrupting the raster-to-vector conversion and the subsequent display of converted vector content. For example, a user can add a new digital ink object 747 (e.g., text) to the text bubble 745d without affecting the conversion and subsequent presentation of the cursive text object 745d, or a subsequent cursive text object (not shown) corresponding to the cursive text 445e shown in FIG. 4A.

FIGS. 8A-9 are a series of diagrams showing the derivation of image vectors by the participant device 106b (FIG. 3A) from pixel data 880 (FIGS. 8A-8C). In the illustrated example, the pixel data 880 corresponds to the pixel area P₂ of the raster image 543 (FIGS. 5A-5B). FIG. 8A shows a portion of the pixel data 880, and FIG. 8B is an enlarged view of the portion of the pixel data 880 corresponding to the text balloon 445b of the drawing 440 (FIG. 4A). Referring to FIG. 8B, the participant device 106b can detect an outer edge 882 of an outline 883 of an object in the pixel data 880 using an edge detection algorithm. In addition or alternately, the participant device 106b can detect an inner edge 884 of the outline 883 using an edge detection algorithm. In some embodiments, the participant device 106b can group and interrelate edges belonging to the same object using known image processing techniques for decomposing an image into regions of uniform or color. In addition or alternately, the participant device 106b can use known algorithms for identifying parts of an image that exhibit rapid change in color/intensity.

In some embodiments, the participant device 106b can also adjust imaging parameters, such as exposure level, to identify and convert objects in the pixel data 880. For example, as shown in FIG. 8C, the participant device 106b can increase image contrast to remove unwanted pixels 885 (FIG. 8B) caused by low exposure and attendant artifacts. In some cases, applying a filter, such as a flood fill cab help remove shadows such that only the most salient features are converted to ink, which can be particularly important for line drawings and text. Other filters can produce dramatically different outputs from the raster image conversion, especially with complex objects like faces.

FIG. 9 shows the digital ink object 545b constructed from a plurality of vectors in the form of stroke segments 990. The stroke segments 990 can be derived based on the detected outline 883 using one or both of the detected inner and outer edges 882 and 884. Each of the corresponding stroke segments 990 is connected to an endpoint of an adjacent one of the stroke segments 990. The shape of each stroke segment (e.g., the curvature) can be based on the shape of the segment along the outline 883. The location and/or number of endpoints can be based on, e.g., the overall path length of the outline 883, the curvature of a given segment 990, and/or an acceptable approximation error, as described below. In various embodiments, the stroke segments can be derived using a Potrace algorithm, a curve fitting algorithm, and/or any of a variety of known image tracing algorithms.

Figure 10:
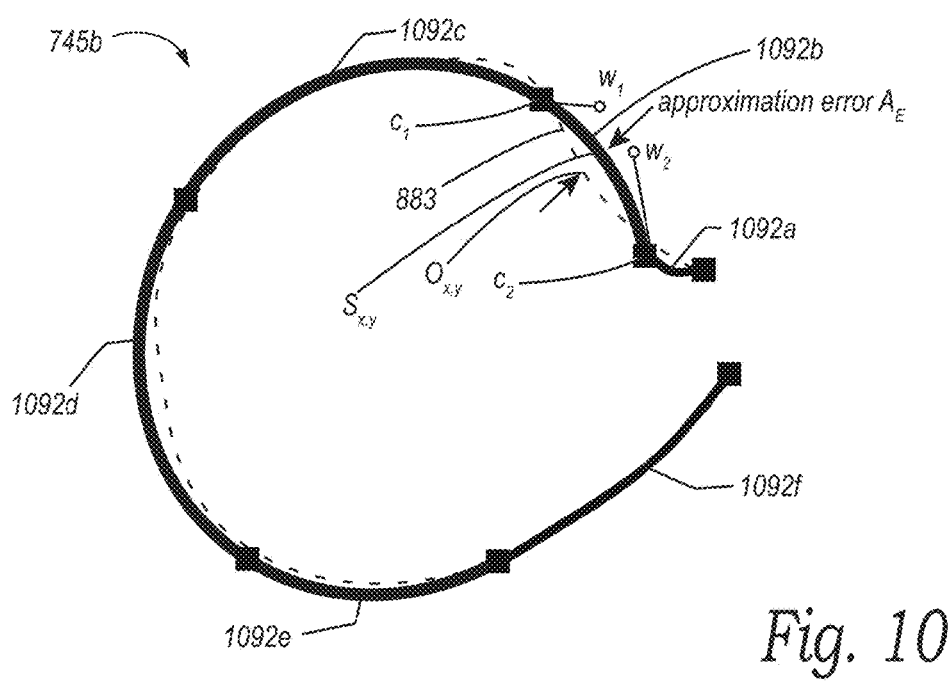
FIG. 10 is a diagram illustrating the derivation of Bézier curves from pixel data.
Figure 11:
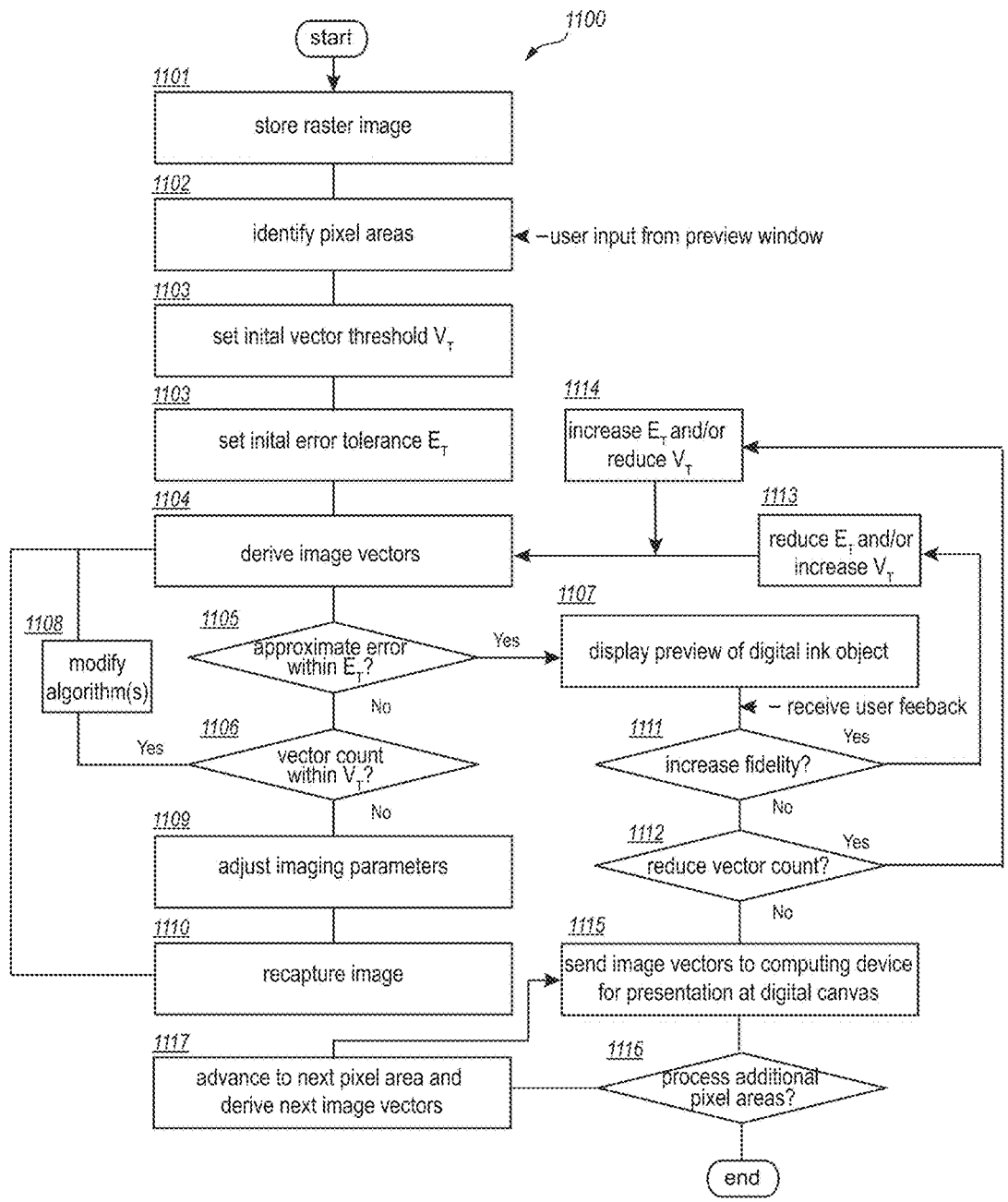
FIG. 11 is a flow diagram illustrating a process for producing digital ink in a collaboration session.

FIG. 10 shows the digital ink object 545b derived with an algorithm for producing vectors in the form Bézier curves 1092. FIG. 11 is a flow diagram illustrating a process 1100 for producing digital ink in a collaboration session. For purposes of illustration, the process 1100 is described in the context of raster-to-vector conversion using the Bézier curves 1092 shown in FIG. 10. The process 1100 can be carried out (in whole or in part) by one or more of the computing devices 106 (FIG. 1), such as the participant device 106b, as discussed above.

At block 1101, the process 1100 begins by storing an image containing content that is to be converted into one or more digital ink objects. The raster image can be an image that is captured using a camera and then stored in internal memory and/or external memory of a participant device. Alternately, the stored image can be a raster image that has been downloaded to a device without the use of a camera.

At block 1102, the process 1100 identifies pixel areas within the image stored at block 1101. The pixel areas can correspond, for example, to the first pixel area $P_1$ (FIG. 5B) selected by the user via the preview window 555 (FIG. 5B). At block 1103, the process 1100 sets a maximum vector threshold $V_T$. For example, the vector threshold $V_T$ can be set to a maximum of, e.g., 20, 50, 100, 500 vectors for a given pixel area. In use, setting a vector threshold $V_T$ cab prevent the algorithm(s) used for raster-to-vector conversion from producing a large number of vectors, which can increase computational time and/or increase in the number of messages required for communicating the vectors to the interactive display 106a (FIG. 3A). In various embodiments, the routine 1100 can subdivide pixel areas and/or split digital objects to avoid computational overflow issues. As described below, in some embodiments, the vector threshold $V_T$ can be adjusted by a user when changing the fidelity of raster-to-vector conversion, such as via the slide tool 668 (FIG. 6B).

At block 1103, the process 1100 sets an initial error tolerance or threshold $E_T$ for the raster-to-vector conversion. The error threshold $E_T$ can be a value, such as 0.1%, 1%, 5%, or other value, which can be a default value. The error threshold $E_T$ can also be adjusted based on the user's feedback via the slide tool 668 (FIG. 6B), as described below. In some embodiments, the error threshold $E_T$ can be initially set to a relatively high level to produce a reduced set of vectors and increase computational efficiency. Alternately, the error threshold $E_T$ can be set to a low level to ensure high fidelity, or the error threshold $E_T$ can be a default level having a balanced ratio of fidelity to computational efficiency.

At block 1104, the process 1100 derives image vectors using one or more raster-to-vector conversion algorithms. Referring to the example of FIG. 10, the process 1100 can derive the Bézier curves 1092 based on a third order Bézier transformation, as follows:

$$S_x = c_{1x} \cdot (1-t)^3 + w_{1x} \cdot 3 \cdot (1-t)^2 \cdot t + w_{2x} \cdot 3 \cdot (1-t) \cdot t^2 + c_{2x} \cdot t^3$$

$$S_y = c_{1y} \cdot (1-t)^3 + w_{1y} \cdot 3 \cdot (1-t)^2 \cdot t + w_{2y} \cdot 3 \cdot (1-t) \cdot t^2 + c_{2y} \cdot t^3$$

where $(S_x, S_y)$ is a sample coordinate along a given curve 1092, $c_1$ is the start point of a vector, $c_2$ is the stop point of the vector, $w_1$ and $w_2$ are weight points, and t is the Bézier interval [0,1].

In various embodiments, an approximation error $A_E$ associated with one or more of the curves 1092 can be compared to the error threshold $E_T$. For example, in the embodiment shown in FIG. 10, an approximate error $A_E$ of the digital object 545b can be calculated as follows:

$$A_E = \text{Average } [n, 0.5 \cdot (O_{xn} - S_x)/(O_{xn}) + 0.5 \cdot (O_{yn} - S_{yn})/(O_{yn})]$$

where $(O_{xn}, O_{yn})$ is a sample point along the outline 883 for a given sample point $(S_{xn}, S_{yn})$ on a corresponding curve 1092, and n is the number of samples taken along the outline 883. Referring back to FIG. 11, if the approximation error $A_E$ is within the error threshold $E_T$ (block 1106) and the vector count does not exceed the vector threshold $V_T$ (block 1107), the process 1100 proceeds to block 1107 to provide a preview of the raster-to-vector conversion.

If the approximation error $A_E$ is not with the error threshold $E_T$, the process 1100 can adjust the vector conversion algorithm(s) (block 1108) used for deriving the vectors at block 1104, so long as the vector threshold $V_T$ is not exceeded (block 1106). For example, the process 1100 can decrease the number of Bézier curves 1092 (FIG. 10) and/or change the start point $c_1$, the stop point $c_2$, and/or one or both of the weight points $w_1$ and $w_2$ of one or more of the curves 1092. In some embodiments, the process 1100 may adjust imaging parameters (e.g., exposure level, contrast, etc.) if one or both of the error threshold $E_T$ and the vector threshold $V_T$ are exceeded, as shown at block 1109. In such cases, the process 1100 can prompt the user to recapture the raster image (block 1110). In some embodiments, the process 1100 can dynamically adjust imaging parameters and vector conversion algorithms with or without prompting the user. For example, the routine 1100 recapture the image without prompting the user if the camera is still directed at the drawing 400 (FIG. 4A).

At block 1107, the process 1100 displays a preview of the digital ink object(s) corresponding to the vectors derived at block 1104. A user can use the preview of the digital object(s) in conjunction with the slide tool 668 (FIG. 6B) to make changes to the fidelity (block 1111) and/or the vector count (block 1112) of the digital ink object(s). In general, the slide tool 668 and/or other graphical tool(s) (not shown) implemented by the system 100 (FIG. 1) can be relatively simple in nature to operate such that they do not require the user to have prerequisite knowledge of vector or other graphics processing. For example, the process 1100 can select the appropriate algorithm(s) and/or imaging parameters without user input other than operation of the slide tool 668.

If the process 1100 detects that the user feedback is a slide of the slide tool 668 to the right, the process 1100 can increase fidelity by reducing the error threshold $E_T$ and/or increasing the vector threshold $V_T$ (block 1113) based on the tool's relative change in position. Alternately, if the user slides the slide tool 668 to the left, the process 1100 can increase the error tolerance and/or decrease the vector threshold $V_T$ (block 1114). In either case, the process 1100 returns to block 1104 to re-derive the image vectors based on the corresponding adjustment(s) to one or both of the error threshold $E_T$ and the vector threshold $V_T$. In some embodiments, the process 1100 can opt to user a different raster-to-vector conversion algorithm at block 1108 in response to the user feedback.

At block 1115, the process 1100 sends the derived image vectors to a computing device, such as the interactive display 106b (FIG. 1), for presenting the digital ink objects at a digital canvas. The process 1100 can proceed to derive additional image vectors (blocks 1116 and 1117) based on the current error and vector thresholds $E_T$ and $V_T$ for any remaining pixel areas that have yet to be processed. In some embodiments, the process 1100 can automatically process and send the subsequent image vectors without prompting the user or requesting any feedback for the subsequent conversion.

Figure 12:
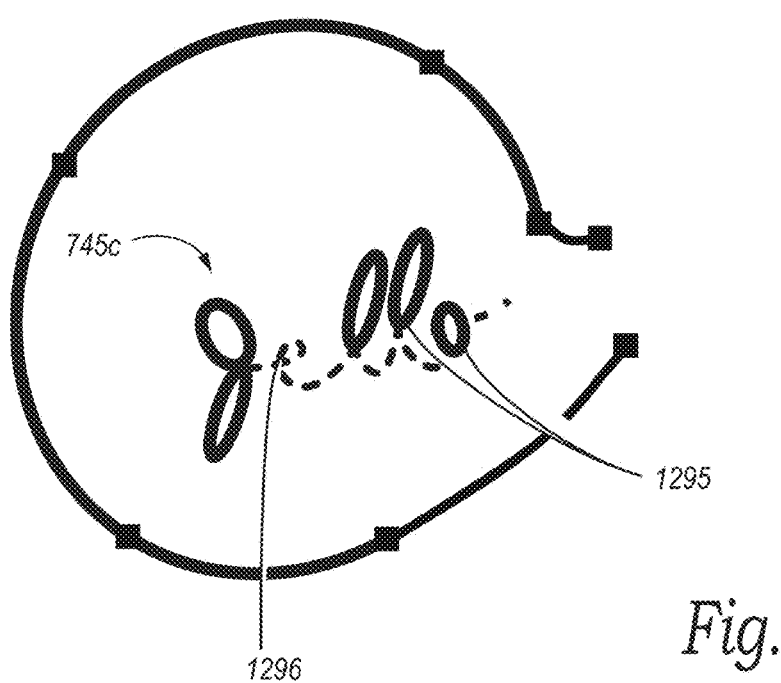
FIG. 12 is a diagram illustrating the derivation of various vector shapes from pixel data.

In some embodiments, other scalable vector graphic (SVG) algorithms and transformations can be used to form digital ink objects from vectors other than Bézier curves, such as shapes, fills, and text glyphs. For example, FIG. 12 shows the digital ink object 545c formed from a plurality of ellipses 1295 combined with curved vectors 1296. In these and other embodiments, vectors can have an associated brush size, color, pattern, etc. Further, vectors can include polygon fills and gradients to reduce the number of ink stroke messages sent to the interactive display 106a (FIG. 1).

From the foregoing, it will be appreciated that specific embodiments of the disclosure have been described herein for purposes of illustration, but that various modifications may be made without deviating from the spirit and scope of the various embodiments of the disclosure. Further while various advantages associated with some embodiments of the disclosure have been described above in the context of those embodiments, other embodiments may also exhibit such advantages, and not all embodiments need necessarily exhibit such advantages to fall within the scope of the invention. Accordingly, the disclosure is not limited, except as by the appended claims.

I claim:

1. A method for producing digital ink in a collaboration session between a first computing device and a second computing device configured to present a digital canvas, the method comprising:
    capturing a raster image of content using a camera operably coupled to the first computing device;
    deriving first image vectors based on pixel data associated with a first portion of the raster image, and second image vectors based on pixel data associated with a second portion of the raster image, and defining an outline based on the pixel data of the first portion of the raster image and determining a plurality of contour segments along the outline;
    sending the first image vectors to the second computing device for displaying a first digital ink object on the canvas based on the first image vectors; and
    sending the second image vectors to the second computing device for displaying a second digital ink object on the canvas based on the second image vectors after the displaying of the first digital ink object.

2. The method of claim 1 further comprising receiving user feedback at the first computing device before sending the first image vectors, wherein deriving the first vectors includes re-deriving the first image vectors based on the user feedback.

3. The method of claim 2 wherein the re-deriving includes increasing a fidelity of the first image vectors to the first portion of the raster image.

4. The method of claim 3 wherein the re-deriving includes decreasing an amount of vectors used to represent the first portion of the raster image.

5. The method of claim 3 wherein the re-deriving includes recapturing an image of the content to be displayed.

6. The method of claim 5 wherein the recapturing includes adjusting an exposure level of the recaptured image relative to an exposure level of the raster image.

7. The method of claim 1, further comprising displaying the first digital ink object at a display of the first computing device while concurrently deriving the second image vectors.

8. The method of claim 1 further comprising receiving user feedback at the first computing device, wherein deriving the first image vectors includes deriving a number of Bezier curves based on the user feedback.

9. The method of claim 1 wherein the first computing device is a mobile device, and wherein the second computing device is an interactive display device.

10. A non-transitory computer-readable storage medium storing instructions that, when executed by a computing system, cause the computing system to perform operations for providing a collaboration session at least between an interactive display device and a participant device, wherein the operations comprise:
    capturing a raster image of content via a camera of the participant device;
    deriving first image vectors based on a first portion of the image by defining an outline based on pixel data of the first portion of the raster image and determining a plurality of contour segments along the outline, and second image vectors based on a second portion of the image,
    sending the first image vectors to the interactive display device for producing first digital ink corresponding to the first portion of the image; and
    sending the second image vectors to the interactive display device for producing second digital ink corresponding to the second portion of the image.

11. The computer-readable storage medium of claim 10 wherein the operations further include receiving user feedback at the participant device before sending the first image vectors, wherein deriving the first vectors includes re-deriving the first image vectors based on the user feedback.

12. The computer-readable storage medium of claim 11 wherein the re-deriving includes one of increasing a fidelity of the first image vectors to the first portion of the raster image and decreasing an amount of vectors used to represent the first portion of the raster image.

13. The computer-readable storage medium of claim 11 wherein the re-deriving includes recapturing an image of the content to be displayed, and adjusting an imaging parameter of the recaptured image.

14. The computer-readable storage medium of claim 11 wherein the re-deriving includes deriving a number of Bezier curves based on the user feedback.

15. A computing system for providing a collaboration session, the system comprising a mobile device having a camera and configured to perform operations, including:
    capturing a raster image of content via the camera;
    deriving first image vectors based on a first portion of the image by defining an outline based on pixel data of the first portion of the raster image and determining a plurality of contour segments along the outline, and second vectors based on a second portion of the image;
    sending the first image vectors to an interactive display device for producing first digital ink vectors at the interactive display device corresponding to the first portion of the image; and
    sending the second image vectors to the interactive display device for producing second digital ink vectors at the interactive display device corresponding to the second portion of the image.

16. The computing system of claim 15 wherein the operations further include receiving user feedback at the mobile device before sending the first image vectors, wherein deriving the first image vectors includes re-deriving the first image vectors based on the user feedback.

17. The computing system of claim 16 wherein the re-deriving includes one of increasing a fidelity of the first image vectors to the first portion of the raster image and decreasing an amount of vectors used to represent the first portion of the raster image.

19. The computing system of claim 16 wherein the re-deriving includes recapturing an image of the content to be displayed, and adjusting an imaging parameter of the recaptured image.

19. The computing system of claim 16 wherein the re-deriving includes deriving a number of Bezier curves based on the user feedback.

* * * * *